(12) United States Patent
Lin et al.

(10) Patent No.: US 11,658,761 B2
(45) Date of Patent: May 23, 2023

(54) USER EQUIPMENT AND METHOD FOR TRANSMITTING SYNCHRONIZATION SIGNAL BLOCK OF SAME

(71) Applicant: GUANGDONG OPPO MOBILE TELECOMMUNICATIONS CORP., LTD., Guangdong (CN)

(72) Inventors: Huei-Ming Lin, South Yarra (AU); Zhenshan Zhao, Guangdong (CN); Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/399,798

(22) Filed: Aug. 11, 2021

(65) Prior Publication Data

US 2021/0376945 A1 Dec. 2, 2021

Related U.S. Application Data

(63) Continuation of application No. 17/204,719, filed on Mar. 17, 2021, now Pat. No. 11,121,795, which is a continuation of application No. PCT/CN2019/108706, filed on Sep. 27, 2019.

(60) Provisional application No. 62/739,539, filed on Oct. 1, 2018.

(51) Int. Cl.
*H04J 11/00* (2006.01)

(52) U.S. Cl.
CPC ....... *H04J 11/0073* (2013.01); *H04J 11/0076* (2013.01)

(58) Field of Classification Search
CPC . H04J 11/0073; H04J 11/0076; H04L 5/0051; H04L 5/0053; H04L 27/261; H04L 27/2602; H04L 27/2666; H04W 4/40; H04W 56/00; H04W 48/10
See application file for complete search history.

(56) References Cited

U.S. PATENT DOCUMENTS

| 2018/0199299 A1* | 7/2018 | Wakabayashi ...... H04W 56/002 |
| 2020/0413359 A1* | 12/2020 | Li .......................... H04L 5/0094 |
| 2021/0058899 A1 | 2/2021 | Lee et al. |

(Continued)

FOREIGN PATENT DOCUMENTS

| CN | 105981454 A | 9/2016 |
| CN | 106797265 A | 5/2017 |

(Continued)

OTHER PUBLICATIONS

3GPP "LTE Device to Device (D2D) Proximity Services (ProSe); User Equipment (UE) radio transmission and reception (Release 12)" 3GPP Technical Report 36.877 V12.0.0; Mar. 2015. 40 pages.

(Continued)

*Primary Examiner* — Hashim S Bhatti
(74) *Attorney, Agent, or Firm* — Perkins Coie LLP

(57) ABSTRACT

A user equipment and a method for transmitting a synchronization signal block (SSB) of the same are provided. The method includes transmitting a resource set associated with an SSB within a subframe or slot, and the SSB includes a sidelink primary synchronization signal (S-PSS), a sidelink secondary synchronization signal (S-SSS), and 0 to 1 physical sidelink broadcast channel (PSBCH) between the S-PSS and S-SSS.

18 Claims, 13 Drawing Sheets

(56) References Cited

U.S. PATENT DOCUMENTS

| | | | |
|---|---|---|---|
| 2021/0068120 A1 | 3/2021 | Jung et al. | |
| 2021/0120564 A1 | 4/2021 | Lee et al. | |
| 2021/0127377 A1 | 4/2021 | Lee et al. | |
| 2021/0320766 A1* | 10/2021 | Li | H04L 5/0053 |
| 2021/0360549 A1* | 11/2021 | Lee | H04W 56/006 |

FOREIGN PATENT DOCUMENTS

| | | |
|---|---|---|
| EP | 3099123 A1 | 11/2016 |
| EP | 3293901 A1 | 3/2018 |
| WO | 2017222206 A1 | 12/2017 |

OTHER PUBLICATIONS

Examination Report for European Application No. 19868288.2 dated May 12, 2022. 5 pages with English translation.

Examination Report for Indian Application No. 202127018089 dated May 25, 2022. 6 pages with English translation.

First Office Action for Chinese Application No. 202110413050.2 dated Mar. 24, 2022. 15 pages with English translation.

Huawei et al. "Sidelink synchronization mechanism for NR V2X" R1-1810139; 3GPP TSG RAN WG1 Meeting #94bis; Chengdu, China; Oct. 8-12, 2018. 4 pages.

Notice of Reasons for Refusal for Japanese Application No. 2021-517832 dated May 24, 2022. 6 pages with English translation.

Second Office Action for Chinese Application No. 202110413050.2 dated Jun. 13, 2022. 7 pages with English translation.

Notice of Allowance dated May 19, 2021 of U.S. Appl. No. 17/204,719, filed Mar. 17, 2021.

International Search Report in the international application No. PCT/CN2019/108706 dated Jan. 6, 2020, International Search Report in the international application No. PCT/CN2019/108706 dated Jan. 6, 2020, Jan. 6, 2020, 2 pp.

3GPP TSG RAN, "LTE Device to Device Proximity Services; User Equipment (UE) radio transmission and reception; Release 12", 3GPP TR 36.877 V2.0.0, Mar. 31, 2015, 42 pp.

Qualcomm Incorporated, "Presentation of Specification/Report to TSG: TR 36.877, Version 2.0.0", RP-150093, Mar. 9-12, 2015, Mar. 2015, 1 pp.

Zte, "Synchronization for V2V", 3GPP TSG-RAN WG1 Meeting #83 R1-156661, Nov. 22, 2015, 6 pp.

Examination Report No. 1 for Australian Application No. 2019352650 dated Nov. 12, 2021. 3 pages.

Extended European Search Report for European Application No. 19868288.2 dated Sep. 30, 2021. 9 pages.

LG Electronics "Discussion on NR sidelink synchronization" R1-1810282; 3GPP TSF RAN WG1 Meeting #94bis; Oct. 8-12, 2018. 6 pages.

Samsung "Discussion on physical layer structures and procedure(s) for NR V2X" R1-1810868; 3GPP TSG RAN WG1 #94bis; Oct. 8-12, 2018. 10 pages.

Examination Report for European Application No. 19868288.2 dated Oct. 13, 2022. 4 pages.

Notice of Reasons for Refusal for Japanese Application No. 2021-517832 dated Nov. 29, 2022. 6 pages with English translation.

Examination Report for European Application No. 19868288.2 dated Mar. 16, 2023. 5 pages.

Lenovo et al. "Synchronization mechanism in NR V2X" R1-1808555; 3GPP TSG RAN WG1 Meeting #94; Gothenburg, Sweden; Aug. 20-24, 2018. 4 pages.

Request for the Submission of an Opinion for Korean Application No. 10-2021-7009720 dated Feb. 20, 2023. 8 pages with English translation.

* cited by examiner

S-PSS  S-SSS  PSBCH

S-PSS  S-SSS  PSBCH

☒ S-PSS  ☐ S-SSS  ⊞ PSBCH

☒ S-PSS  ☐ S-SSS  ⊞ PSBCH

DMRS  PSBCH

DMRS  PSBCH

☒ S-PSS ☰ S-SSS ⊞ PSBCH ☐ Empty

☒ S-PSS ☰ S-SSS ⊞ PSBCH ☐ Empty

☒ S-PSS ☰ S-SSS ⊞ PSBCH ☐ Empty

S-PSS   S-SSS   PSBCH   Empty

S-PSS   S-SSS   PSBCH   Empty

S-PSS   S-SSS   PSBCH   Empty

S-PSS  S-SSS  PSBCH

S-PSS  S-SSS  PSBCH
AGC  GP

USER EQUIPMENT AND METHOD FOR TRANSMITTING SYNCHRONIZATION SIGNAL BLOCK OF SAME

CROSS-REFERENCE TO RELATED APPLICATIONS

The present application is a continuation application of U.S. application Ser. No. 17/204,719 filed on Mar. 17, 2021, which is a continuation application of International Application No. PCT/CN2019/108706, filed on Sep. 27, 2019, which claims priority to U.S. provisional application No. 62/739,539, filed on Oct. 1, 2018. The present application claims priority and the benefit of the above-identified applications and the above-identified applications are incorporated by reference herein in their entireties.

BACKGROUND OF DISCLOSURE

1. Field of Disclosure

The present disclosure relates to the field of communication systems, and more particularly, to a user equipment and a method for transmitting a synchronization signal block (SSB) of the same.

2. Description of Related Art

The development of wireless technologies for direct vehicle-to-vehicle (V2V) or vehicle-to-everything (V2X) communication as part of intelligent transportation system (ITS) is gradually evolving from broadcasting basic safety transmissions like periodic vehicle status and warning messages to supporting more advanced use cases and services like extended sensor data sharing, autonomous driving, and vehicle platooning.

Under long term evolution-V2X (LTE-V2X) communication technologies are developed by 3rd generation partnership project (3GPP) in release 14 and release 15. In release-16, V2X communication technologies are further developed in new radio (NR) architectures, i.e., NR-V2X.

There is a need to propose a user equipment and a method for transmitting a synchronization signal block (SSB) of the same capable of performing vehicle-to-everything (V2X) communication and improving reliability.

SUMMARY

An object of the present disclosure is to propose an apparatus and a method for transmitting a synchronization signal block (SSB) of the same capable of performing UE-UE scheduling in vehicle-to-everything (V2X) communication and improving reliability.

In a first aspect of the present disclosure, a user equipment for transmitting a synchronization signal block (SSB) includes a memory, a transceiver, and a processor coupled to the memory and the transceiver. The processor is configured to control the transceiver to transmit a resource set associated with an SSB within a subframe or slot, and the SSB includes sidelink primary synchronization signal (S-PSS), sidelink secondary synchronization signal (S-SSS), and physical sidelink broadcast channel (PSBCH), and the resource set includes two orthogonal frequency division multiplexing (OFDM) symbols used for the S-PSS, two OFDM symbols used for the S-SSS, more than 1 OFDM symbol used for the PSBCH, and 0 to 1 OFDM symbol within the OFDM symbols used for the PSBCH is between the OFDM symbols for the S-PSS and the S-SSS, and positions of the OFDM symbols used for the S-PSS are in front of positions of the OFDM symbols used for the S-SSS.

In a second aspect of the present disclosure, a method for transmitting a synchronization signal block (SSB) of a user equipment includes transmitting a resource set associated with an SSB within a subframe or slot, wherein the SSB includes sidelink primary synchronization signal (S-PSS), sidelink secondary synchronization signal (S-SSS), and physical sidelink broadcast channel (PSBCH), and the resource set includes two orthogonal frequency division multiplexing (OFDM) symbols used for the S-PSS, two OFDM symbols used for the S-SSS, more than 1 OFDM symbol used for the PSBCH, and 0 to 1 OFDM symbol within the OFDM symbols used for the PSBCH is between the OFDM symbols for the S-PSS and the S-SSS, and positions of the OFDM symbols used for the S-PSS are in front of positions of the OFDM symbols used for the S-SSS.

In a third aspect of the present disclosure, a non-transitory machine-readable storage medium has stored thereon instructions that, when executed by a computer, cause the computer to perform the above method.

In a fourth aspect of the present disclosure, a terminal device includes a processor and a memory configured to store a computer program. The processor is configured to execute the computer program stored in the memory to perform the above method.

BRIEF DESCRIPTION OF DRAWINGS

In order to more clearly illustrate the implementations of the present disclosure or related art, the following figures will be described in the implementations are briefly introduced. It is obvious that the drawings are merely some implementations of the present disclosure, a person having ordinary skill in this field can obtain other figures according to these figures without paying the premise.

DETAILED DESCRIPTION OF IMPLEMENTATIONS

Implementations of the present disclosure are described in detail with the technical matters, structural features, achieved objects, and effects with reference to the accompanying drawings as follows. Specifically, the terminologies in the implementations of the present disclosure are merely for describing the purpose of the certain implementation, but not to limit the disclosure.

In 3rd generation partnership project (3GPP) release 16, some new features are being discussed, e.g., for new radio vehicle-to-everything (NR-V2X). For example, numerologies and waveforms of NR-V2X are under discussion. In long term evolution V2X (LTE-V2X), a sidelink synchronization signal (SLSS) and a physical sidelink broadcast channel (PSBCH) are transmitted within a subframe or slot. There are two orthogonal frequency division multiplexing (OFDM) symbols used for a sidelink primary synchronization signal (S-PSS), two OFDM symbols used for a sidelink secondary synchronization signal (S-SSS), three OFDM symbols used for a demodulation reference signal (DMRS), rest OFDM symbols are used for the PSBCH, or an automatic gain control (AGC) symbol, or a guard period (GP) symbol. How to transmit the SLSS and the PSBCH in NR-V2X needs to be studied.

Figure 1:
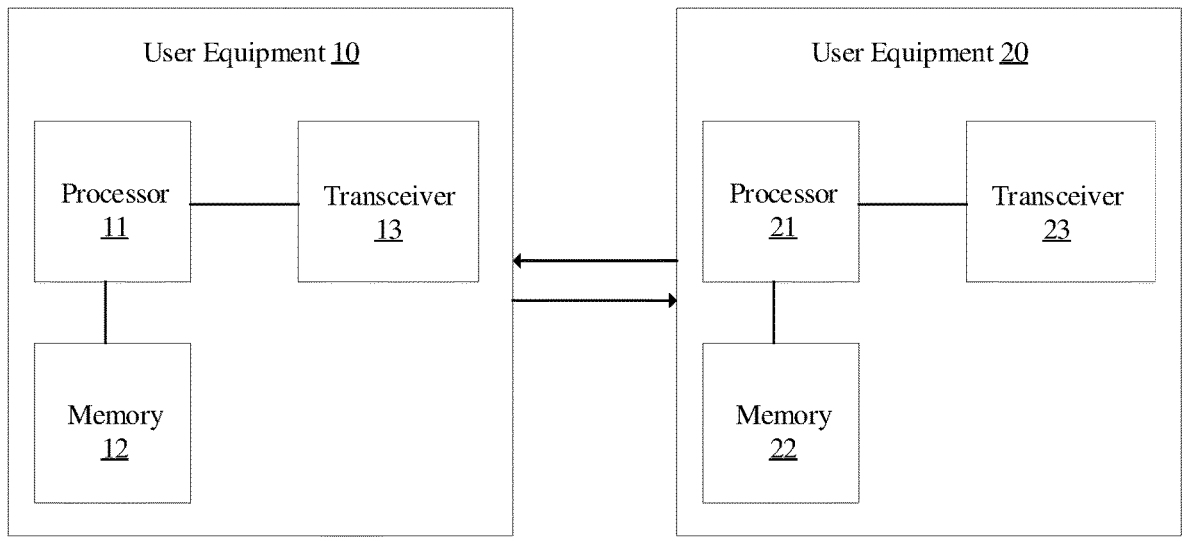
FIG. 1 is a block diagram of a user equipment and another user equipment for transmitting a synchronization signal block (SSB) according to an implementation of the present disclosure.

FIG. 1 illustrates that, in some implementations, a user equipment (UE) 10 and another user equipment 20 for transmitting a synchronization signal block (SSB) according to an implementation of the present disclosure are provided. The UE 10 may include a processor 11, a memory 12, and a transceiver 13. The UE 20 may include a processor 21, a memory 22, and a transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include an application-specific integrated circuit (ASIC), other chipsets, logic circuit and/or data processing devices. The memory 12 or 22 may include a read-only memory (ROM), a random access memory (RAM), a flash memory, a memory card, a storage medium and/or other storage devices. The transceiver 13 or 23 may include baseband circuitry to process radio frequency signals. When the implementations are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21, in which those can be communicatively coupled to the processor 11 or 21 via various means are known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) release 14, 15, 16, and beyond. UEs communicate with each other directly via a sidelink interface such as a PC5 interface.

FIG. 1 illustrates that, in some implementations, the processor 11 is configured to control the transceiver 13 to transmit a resource set associated with an SSB within a subframe or slot, and the SSB includes sidelink primary synchronization signal (S-PSS), sidelink secondary synchronization signal (S-SSS), and physical sidelink broadcast channel (PSBCH), and the resource set includes two orthogonal frequency division multiplexing (OFDM) symbols used for the S-PSS, two OFDM symbols used for the S-SSS, more than 1 OFDM symbol used for the PSBCH, and 0 to 1 OFDM symbol within the OFDM symbols used for the PSBCH is between the OFDM symbols for the S-PSS and the S-SSS. , and positions of the OFDM symbols used for the S-PSS are in front of positions of the OFDM symbols used for the S-SSS.

In some implementations, the two OFDM symbols used for the S-PSS are adjacent OFDM symbols. The same S-PSS sequence is mapped on the two OFDM symbols. In some implementations, the two OFDM symbols used for the S-SSS are adjacent OFDM symbols. The same S-SSS sequence is mapped on the two OFDM symbols. In some implementations, a first OFDM symbol used for the PSBCH after the OFDM symbol used for the S-PSS includes resources used for DMRS which is configured to decode the PSBCH. In some implementations, the DMRS occupies odd or even sub-carriers or resource elements within a physical resource block (PRB). In some implementations, parameters configured to determine a comb-like resource mapping of the PSBCH are pre-configured or configured by a network. In some implementations, frequency resources of the S-PSS and the S-SSS are same.

In some implementations, the resource set includes a resource configured to transmit the PSBCH, and the resource configured to transmit the PSBCH includes a resource configured to transmit a PSBCH payload and a resource configured to transmit a demodulation reference signal (DMRS) which is configured to decode the PSBCH. In some implementations, within the SSB, there are a plurality of adjacent orthogonal frequency division multiplexing (OFDM) symbols used for the S-PSS, there are a plurality of adjacent OFDM symbols used for the S-SSS, there are 0 to 1 OFDM symbol used for the PSBCH, and positions of the adjacent OFDM symbols used for the S-PSS are in front of positions of the adjacent OFDM symbols used for the S-SSS. In some implementations, the SSB further includes an automatic gain control (AGC) symbol positioned in front of the S-PSS.

In some implementations, the AGC symbol is at beginning of the slot and mapped with the PSBCH or configured to pad bits. In some implementations, the AGC symbol is comb-like mapped with the PSBCH. In some implementations, the SSB further includes a guard period (GP) symbol positioned in rear of the S-SSS. In some implementations, the GP symbol is left empty or the GP symbol is comb-like mapped with the PSBCH. In some implementations, frequency resources of the S-PSS and the S-SSS are same. In some implementations, the frequency resource includes frequency resource size and/or starting position. In some implementations, frequency resource sizes of the S-PSS and the S-SSS are same. In some implementations, starting positions in a frequency domain of the S-PSS and the S-SSS are same. In another implementation, the S-SSS can also be in front of the S-PSS. In another implementation, the S-PSS can also be in between of the two OFDM symbols used for S-SSS.

In some implementations, the S-PSS is in front of the S-SSS or the S-SSS is in front of the S-PSS. In some implementations, for comb-like resource mapping of a S-PSS sequence, a S-SSS sequence, and a PSBCH payload, parameters configured to determine a comb-like resource mapping are pre-configured or configured by a network. In some implementations, the SSB is located at a frequency center of a carrier or a frequency location of the SSB is pre-configured or configured by a network. In some implementations, a position of the SSB in a time domain is pre-configured or configured by a network. In some implementations, a periodicity of the SSB is pre-configured or configured by a network. In some implementations, a comb-like resource mapping of the S-PSS is onto a first or last OFDM symbol of the SSB. In some implementations, a comb-like resource mapping of the S-SSS is onto a first or last OFDM symbol of the SSB.

In some implementations, a comb-like resource mapping of the PSBCH is onto a first or last OFDM symbol of the SSB. In some implementations, if the S-PSS is comb-like mapped to one OFDM symbol, rest OFDM symbols used for the S-PSS are also comb-like mapped. In some implementations, if the S-SSS is comb-like mapped to one OFDM symbol, rest OFDM symbols used for the S-SSS are also comb-like mapped.

Figure 2:
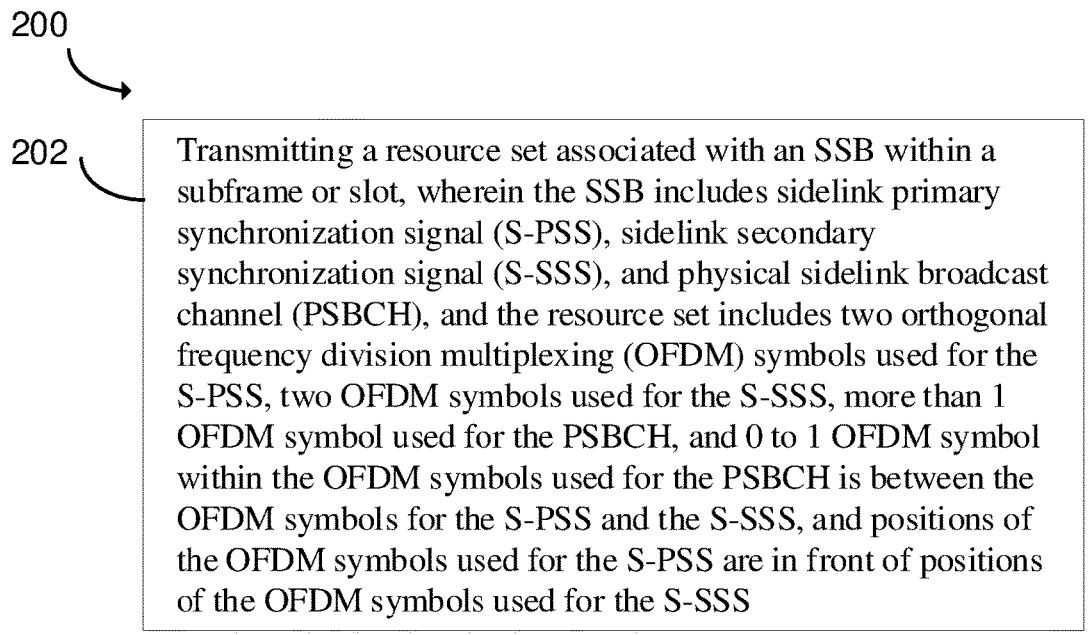
FIG. 2 is a flowchart illustrating a method for transmitting a synchronization signal block (SSB) of a user equipment according to an implementation of the present disclosure.

FIG. 2 illustrates a method 200 for transmitting a synchronization signal block (SSB) of a user equipment according to an implementation of the present disclosure. In some implementations, the method 200 includes: a block 202, transmitting a resource set associated with an SSB within a subframe or slot, wherein the SSB includes sidelink primary synchronization signal (S-PSS), sidelink secondary synchronization signal (S-SSS), and physical sidelink broadcast channel (PSBCH), and the resource set includes two orthogonal frequency division multiplexing (OFDM) symbols used for the S-PSS, two OFDM symbols used for the S-SSS, more than 1 OFDM symbol used for the PSBCH, and 0 to 1 OFDM symbol within the OFDM symbols used for the PSBCH is between the OFDM symbols for the S-PSS and the S-SSS, and positions of the OFDM symbols used for the S-PSS are in front of positions of the OFDM symbols used for the S-SSS.

In some implementations, the two OFDM symbols used for the S-PSS are adjacent OFDM symbols. The same S-PSS sequence is mapped on the two OFDM symbols. In some implementations, the two OFDM symbols used for the S-SSS are adjacent OFDM symbols. The same S-SSS sequence is mapped on the two OFDM symbols. In some implementations, a first OFDM symbol used for the PSBCH after the OFDM symbol used for the S-PSS includes resources used for DMRS which is configured to decode the PSBCH. In some implementations, the DMRS occupies odd or even sub-carriers or resource elements within a physical resource block (PRB). In some implementations, parameters configured to determine a comb-like resource mapping of the PSBCH are pre-configured or configured by a network. In some implementations, frequency resources of the S-PSS and the S-SSS are same.

In some implementations, the resource set includes a resource configured to transmit the PSBCH, and the resource configured to transmit the PSBCH includes a resource configured to transmit a PSBCH payload and a resource configured to transmit a demodulation reference signal (DMRS) which is configured to decode the PSBCH. In some implementations, within the SSB, there are a plurality of adjacent orthogonal frequency division multiplexing (OFDM) symbols used for the S-PSS, there are a plurality of adjacent OFDM symbols used for the S-SSS, there are 0 to 1 OFDM symbol used for the PSBCH, and positions of the adjacent OFDM symbols used for the S-PSS are in front of positions of the adjacent OFDM symbols used for the S-SSS. In some implementations, the SSB further includes an automatic gain control (AGC) symbol positioned in front of the S-PSS.

In some implementations, the AGC symbol is at beginning of the slot and mapped with the PSBCH or configured to pad bits. In some implementations, the AGC symbol is comb-like mapped with the PSBCH. In some implementations, the SSB further includes a guard period (GP) symbol positioned in rear of the S-SSS. In some implementations, the GP symbol is left empty or the GP symbol is comb-like mapped with the PSBCH. In some implementations, frequency resources of the S-PSS and the S-SSS are same. In some implementations, the frequency resource includes frequency resource size and/or starting position. In some implementations, frequency resource sizes of the S-PSS and the S-SSS are same. In some implementations, starting positions in a frequency domain of the S-PSS and the S-SSS are same. In another implementation, the S-SSS can also be in front of the S-PSS. In another implementation, the S-PSS can also be in between of the two OFDM symbols used for S-SSS.

In some implementations, the S-PSS is in front of the S-SSS or the S-SSS is in front of the S-PSS. In some implementations, for comb-like resource mapping of a S-PSS sequence, a S-SSS sequence, and a PSBCH payload, parameters configured to determine a comb-like resource mapping are pre-configured or configured by a network. In some implementations, the SSB is located at a frequency center of a carrier or a frequency location of the SSB is pre-configured or configured by a network. In some implementations, a position of the SSB in a time domain is pre-configured or configured by a network. In some implementations, a periodicity of the SSB is pre-configured or configured by a network. In some implementations, a comb-like resource mapping of the S-PSS is onto a first or last OFDM symbol of the SSB. In some implementations, a comb-like resource mapping of the S-SSS is onto a first or last OFDM symbol of the SSB.

In some implementations, a comb-like resource mapping of the PSBCH is onto a first or last OFDM symbol of the SSB. In some implementations, if the S-PSS is comb-like mapped to one OFDM symbol, rest OFDM symbols used for the S-PSS are also comb-like mapped. In some implementations, if the S-SSS is comb-like mapped to one OFDM symbol, rest OFDM symbols used for the S-SSS are also comb-like mapped.

In some implementations, a resource set which is used to transmit SLSS and PSBCH can be called as an SSB. The SSB can be transmitted within a subframe or slot. The SSB includes at least S-PSS, S-SSS, and PSBCH. It can be understood that a resource that is used for transmitting PSBCH includes both a resource used for transmitting a PSBCH payload and a resource used for transmitting a DMRS which is used for decoding the PSBCH.

FIGS. 3A, 3B, 3C, and 3D illustrate that, in some implementations, within an SSB, there are two adjacent OFDM symbols used for S-PSS, two adjacent OFDM symbols used for S-SSS, more than 1 OFDM symbol used for a PSBCH.

Figure 3A:
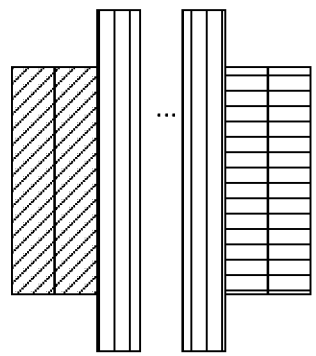
FIG. 3A is a schematic diagram of an exemplary illustration of a synchronization signal block (SSB) according to an implementation of the present disclosure.

FIG. 3A illustrates that, in some implementations, within an SSB, there are two adjacent OFDM symbols used for S-PSS, two adjacent OFDM symbols used for S-SSS. The OFDM symbols of the S-PSS are at the beginning of the SSB. There are two adjacent OFDM symbols used for the S-SSS and the OFDM symbols of the S-SSS are at the end of the SSB. The OFDM symbols of the PSBCH are between the S-PSS and the S-SSS. There are more than 1 OFDM symbol used for the PSBCH. In some implementations, there is 0 or 1 OFDM symbol used for the PSBCH between the S-PSS and the S-SSS.

Figure 3B:
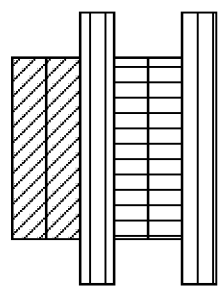
FIG. 3B is a schematic diagram of an exemplary illustration of a synchronization signal block (SSB) according to an implementation of the present disclosure.

FIG. 3B illustrates that, in some implementations, within an SSB, there are two adjacent OFDM symbols used for S-PSS, the OFDM symbols of the S-PSS are at the beginning of the SSB. There are 2 OFDM symbols used for the PSBCH. One OFDM symbol of the PSBCH is before a position of S-SSS symbol and another OFDM symbol of the PSBCH is after a position of S-SSS symbol. For example, within the SSB, 1st and 2nd OFDM symbols used for the S-PSS, 3rd and 6th OFDM symbols used for the PSBCH, 4th and 5th OFDM symbols used for the S-SSS.

Figure 3C:
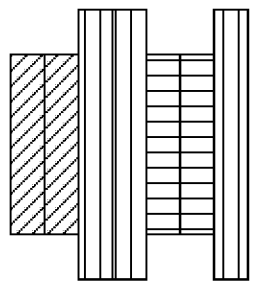
FIG. 3C is a schematic diagram of an exemplary illustration of a synchronization signal block (SSB) according to an implementation of the present disclosure.

FIG. 3C illustrates that, in some implementations, within an SSB, OFDM symbols for S-PSS are at the beginning of the SSB. There are 3 OFDM symbols used for a PSBCH. Two OFDM symbols of the PSBCH are before a position of S-SSS symbol and another OFDM symbol of the PSBCH is after a position of S-SSS symbol. For example, within the SSB, 1st and 2nd OFDM symbols used for the S-PSS, 3rd, $4^{th}$, and 7th OFDM symbols used for the PSBCH, and 5th and 6th OFDM symbols used for the S-SSS.

Figure 3D:
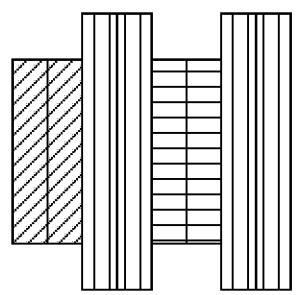
FIG. 3D is a schematic diagram of an exemplary illustration of a synchronization signal block (SSB) according to an implementation of the present disclosure.

FIG. 3D illustrates that, in some implementations, within an SSB, OFDM symbols for S-PSS are at the beginning of the SSB. There are 4 OFDM symbols used for a PSBCH. Two OFDM symbols of the PSBCH are before a position of S-SSS OFDM symbols and another two OFDM symbols of the PSBCH are after a position of S-SSS OFDM symbols. For example, within the SSB, 1st and 2nd OFDM symbols used for the S-PSS, 3rd, 4th, 7th, and 8th OFDM symbols used for the PSBCH, and 5th and 6th OFDM symbols used for the S-SSS.

Figure 4A:
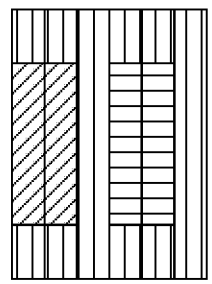
FIG. 4A is a schematic diagram of an exemplary illustration of a synchronization signal block (SSB) according to an implementation of the present disclosure.
Figure 4B:
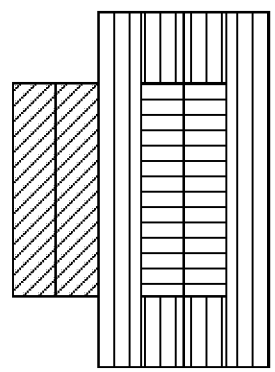
FIG. 4B is a schematic diagram of an exemplary illustration of a synchronization signal block (SSB) according to an implementation of the present disclosure.

In all of the above implementations, a frequency resource of PSBCH can be larger than the S-PSS and the S-SSS. For example, 24 resource blocks (RBs) used for the PSBCH per an OFDM symbol, and only 12 RBs used for the S-PSS or the S-SSS per an OFDM symbol. If a frequency resource of the PSBCH is larger than the S-PSS and/or the S-SSS, a part of a frequency resource on the OFDM symbols used for the S-PSS and/or the S-SSS can also be used for the PSBCH, which is illustrated in FIGS. 4A and 4B. The frequency resources of the PSBCH and the S-SSS can be aligned, or the frequency resources of the PSBCH and the S-PSS can be aligned.

FIGS. 4A and 4B are an illustration of how to map the PSBCH on the OFDM symbols used for the S-PSS and/or the S-SSS of FIG. 3D. The mechanism can also be applied to other figures such as FIGS. 3A, 3B, and 3C.

In all of the above implementations, resources used for a PSBCH transmission includes resources used for both a PSBCH payload and a DMRS. There are two candidate ways to multiplex the DMRS and the PSBCH payload, which is illustrated in FIGS. 5A and 5B.

Figure 5A:
FIG. 5A is a schematic diagram of an exemplary illustration of a synchronization signal block (SSB) according to an implementation of the present disclosure.

In FIG. 5A, the DMRS are mapped to some resource element of the resource block (RB) which is used to map the PSBCH payload. There is one out of K resource elements used for the DMRS within the RB. For example, within the RB, there are 12 resource elements in a frequency domain, with an index range from 0 to 11. The DMRS can occupy the even or odd resource elements per RB. This multiplexing scheme can be applied to a cyclic prefix orthogonal frequency division multiplexing (CP-OFDM) system.

Figure 5B:
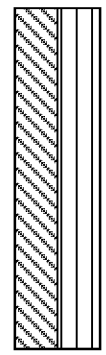
FIG. 5B is a schematic diagram of an exemplary illustration of a synchronization signal block (SSB) according to an implementation of the present disclosure.

In FIG. 5B, the DMRS can occupy a separate OFDM symbol which is different with the OFDM symbols used for the PSBCH payload. For example, in In FIG. 3D, the 3rd and 7th OFDM symbols are used for the DMRS, the 4th and 8th OFDM symbols are used for the PSBCH payload. This multiplexing scheme can be applied to a discrete fourier transform spread orthogonal frequency division multiplexing (DFT-s-OFDM) system.

Figure 6:
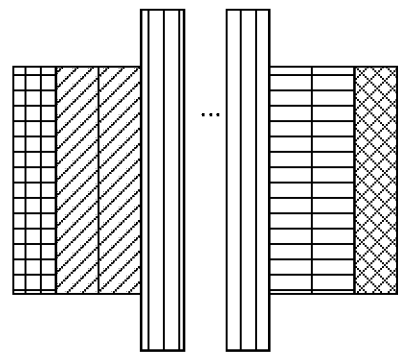
FIG. 6 is a schematic diagram of an exemplary illustration of a synchronization signal block (SSB) according to an implementation of the present disclosure.

In all of the above implementations, there can be one additional OFDM in front of the first OFDM of the SSB that is used as AGC, and/or one additional OFDM symbol after the last OFDM symbol of the SSB that is used as guard period (GP). One illustration of FIG. 3A with additional AGC and GP symbols is illustrated in FIG. 6. The AGC symbol can be mapped with the PSBCH or padding bits. In some implementations, if AGC symbol is mapped with the PSBCH, comb-like resource mapping can be applied, which is similar as the first OFDM symbol in FIG. 7A, the rest resource elements that are not mapped by the PSBCH are left empty. The GP symbol can be left empty. Or the GP symbol can be comb-like mapped by the PSBCH which is similar as the last OFDM symbol in FIG. 7A, the rest resource elements that are not mapped by the PSBCH are left empty.

Figure 7A:
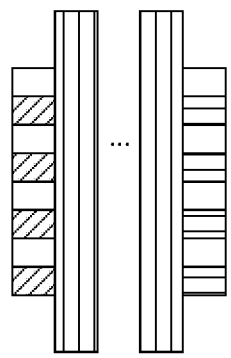
FIG. 7A is a schematic diagram of an exemplary illustration of a synchronization signal block (SSB) according to an implementation of the present disclosure.
Figure 7B:
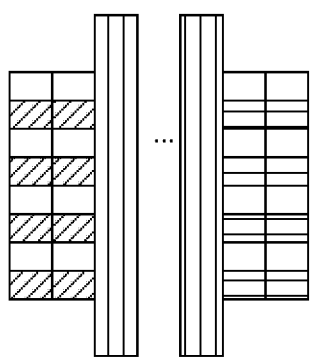
FIG. 7B is a schematic diagram of an exemplary illustration of a synchronization signal block (SSB) according to an implementation of the present disclosure.

FIGS. 7A and 7B illustrate that, in some implementations, the OFDM symbols are used for the S-PSS and the S-SSS, comb-like resource mapping is applied to a S-PSS sequence and a S-SSS sequence separately.

FIG. 7A illustrates that, in some implementations, within an SSB, there are one OFDM symbol used for a S-PSS, one OFDM symbol used for a S-SSS, more than 1 OFDM symbol used for a PSBCH. The OFDM symbol used for the S-PSS is at the beginning of the SSB. The OFDM symbol used for the S-SSS is at the end of the SSB. A S-PSS sequence is mapped to one resource element per A resource elements on the S-PSS OFDM symbol, i.e., the number of resource elements of adjacent S-PSS signal on the S-PSS OFDM symbol is A. A S-SSS sequence is mapped to one resource element per B resource elements on the S-SSS OFDM symbol, i.e., the number of resource elements of adjacent S-SSS signal on the S-SSS OFDM symbol is B. The rest resource elements that are not mapped by the S-PSS or S-SSS sequence on the S-PSS or S-SSS OFDM symbols are left empty.

FIG. 7B illustrates that, in some implementations, within an SSB, there are two OFDM symbols used for S-PSS, two OFDM symbols used for a S-SSS, more than 1 OFDM symbol used for a PSBCH. The two OFDM symbols used for a S-PSS are adjacent in time domain. The two OFDM symbols used for the S-SSS are adjacent in a time domain. The OFDM symbols used for the S-PSS are at the beginning of the SSB. The OFDM symbols used for the S-SSS are at the end of the SSB. A S-PSS sequence is mapped to one resource element per C resource elements on the S-PSS OFDM symbol, i.e., the number of resource elements of adjacent S-PSS signal on the S-PSS OFDM symbol is C. A S-SSS sequence is mapped to one resource element per D resource elements on the S-SSS OFDM symbol, i.e., the number of resource elements of adjacent S-SSS signal on the S-SSS OFDM symbol is D. The rest resource elements that are not mapped with the S-PSS or S-SSS sequence on the S-PSS or S-SSS OFDM symbols are left empty.

Figure 8A:
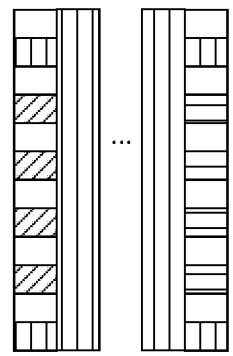
FIG. 8A is a schematic diagram of an exemplary illustration of a synchronization signal block (SSB) according to an implementation of the present disclosure.
Figure 8B:
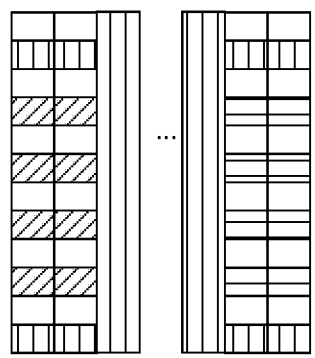
FIG. 8B is a schematic diagram of an exemplary illustration of a synchronization signal block (SSB) according to an implementation of the present disclosure.
Figure 8C:
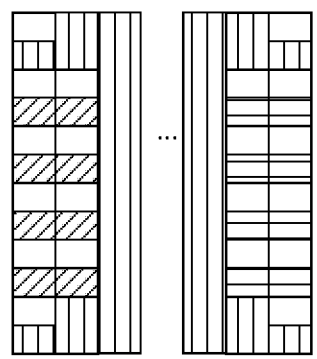
FIG. 8C is a schematic diagram of an exemplary illustration of a synchronization signal block (SSB) according to an implementation of the present disclosure.

For example, on the S-PSS OFDM symbol, the S-PSS sequence is mapped to even resource elements. On the S-SSS OFDM symbol, the S-SSS sequence is mapped to even resource elements. In another example, on the S-PSS OFDM symbol, the S-PSS sequence is mapped to even resource elements. On the S-SSS OFDM symbol, the S-SSS sequence is mapped to odd resource elements. In some implementations of FIGS. 7A and 7B, the resources used for a PSBCH transmission includes the resources used for both PSBCH payload and DMRS. The two candidate ways to multiplex DMRS and PSBCH payload, which is illustrated in FIGS. 5A and 5B, are also applied for these implementations. In some implementations of FIGS. 7A and 7B, if the frequency resource of PSBCH is larger than S-PSS and S-SSS, part of the frequency resource on the OFDM symbols used for S-PSS and/or S-SSS can also be used for PSBCH to align the frequency resource between PSBCH and S-SSS, or between PSBCH and S-PSS. One illustration is illustrated in FIGS. 8A, 8B, and 8C. In FIGS. 8A and 8B, the PSBCH which is mapped to the OFDM symbols of S-PSS and S-SSS using the same comb-like mapping scheme as S-PSS and S-SSS. In FIG. 8C, the PSBCH which is mapped to the first S-PSS OFDM symbol, and the second S-SSS OFDM symbol, uses the same comb-like mapping scheme as S-PSS and S-SSS. The PSBCH which is mapped to the second S-PSS OFDM symbol, and the first S-SSS OFDM symbol, is mapped to all the resource elements per RB that is to be mapped for PSBCH.

Figure 9A:
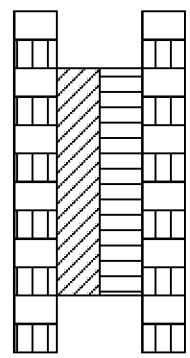
FIG. 9A is a schematic diagram of an exemplary illustration of a synchronization signal block (SSB) according to an implementation of the present disclosure.
Figure 9B:
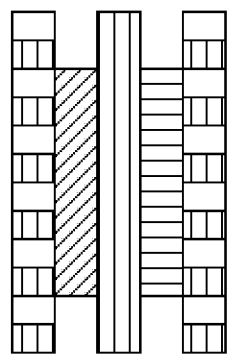
FIG. 9B is a schematic diagram of an exemplary illustration of a synchronization signal block (SSB) according to an implementation of the present disclosure.
Figure 9C:
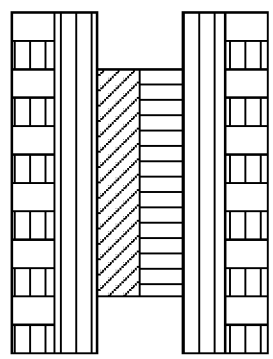
FIG. 9C is a schematic diagram of an exemplary illustration of a synchronization signal block (SSB) according to an implementation of the present disclosure.
Figure 9D:
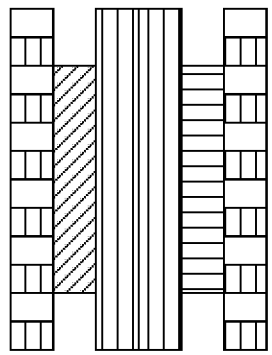
FIG. 9D is a schematic diagram of an exemplary illustration of a synchronization signal block (SSB) according to an implementation of the present disclosure.
Figure 10:
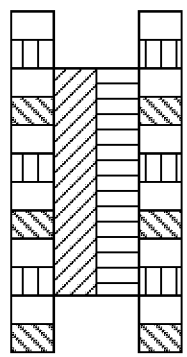
FIG. 10 is a schematic diagram of an exemplary illustration of a synchronization signal block (SSB) according to an implementation of the present disclosure.

FIGS. 9A, 9B, 9C, and 9D illustrate that, in some implementations, within an SSB, the first and last OFDM symbols are used for PSBCH. Comb-like resource mapping is applied to PSBCH on the first and last OFDM symbols. The rest resource elements on the first and last OFDM symbols which are not mapped by PSBCH are left empty. FIG. 9A illustrates that, in some implementations, within an SSB, there are two OFDM symbols used for PSBCH, one OFDM symbol for S-PSS and one OFDM symbol for S-SSS. Within an SSB, the 2nd OFDM symbol is used for S-PSS, the 3rd OFDM symbol is used for S-SSS. FIG. 9B illustrates that, in some implementations, within an SSB, there are three OFDM symbols used for PSBCH, one OFDM symbol for S-PSS and one OFDM symbol for S-SSS. Within an SSB, the 1st, 3rd, 5th OFDM symbols are used for PSBCH, 2nd OFDM symbol for S-PSS, and 4th OFDM symbol are used for S-SSS. FIG. 9C illustrates that, in some implementations, within an SSB, there are four OFDM symbols used for PSBCH, one OFDM symbol for S-PSS and one OFDM symbol for S-SSS. Within a SSB, the 1st, 2nd, 5th, 6th OFDM symbols are used for PSBCH, 3rd OFDM symbol is used for S-PSS, and 4th OFDM symbol is used for S-SSS. FIG. 9D illustrates that, in some implementations, within an SSB, there are four OFDM symbols used for PSBCH, one OFDM symbol is used for S-PSS and one OFDM symbol is used for S-SSS. Within an SSB, the 1st, 3rd, 4th, and 6th OFDM symbols are used for PSBCH, 2nd OFDM symbol is used for S-PSS, and 5th OFDM symbol is used for S-SSS. FIGS. 9A, 9B, 9C, and 9D illustrate that, in some implementations, the resources used for PSBCH transmission includes the resources used for both PSBCH payload and DMRS. The two candidate ways to multiplex DMRS and PSBCH payload, which is illustrated in FIG. 5, are also applicable for FIGS. 9A, 9B, 9C, and 9D. One illustration multiplexing between DMRS and PSBCH payload of FIG. 9A is illustrated in FIG. 10. FIGS. 9A, 9B, 9C, and 9D illustrate that, in some implementations, if the frequency resource of PSBCH is larger than S-PSS and S-SSS, part of the frequency resource on the OFDM symbols used for S-PSS and/or S-SSS can also be used for PSBCH to align the frequency resource between PSBCH and S-SSS, or between PSBCH and S-PSS.

FIGS. 11A, 11B, 11C, and 11D illustrate that, in some implementations, within an SSB, the first and last OFDM symbols are used for PSBCH. Comb-like resource mapping is applied to PSBCH on the first and last OFDM symbols. The rest resource elements on the first and last OFDM symbols which are not mapped by PSBCH are left empty.

Figure 11A:
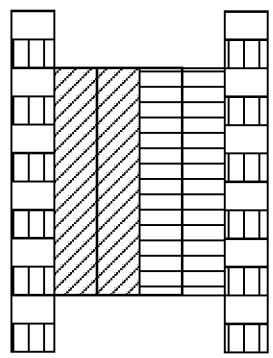
FIG. 11A is a schematic diagram of an exemplary illustration of a synchronization signal block (SSB) according to an implementation of the present disclosure.
Figure 11B:
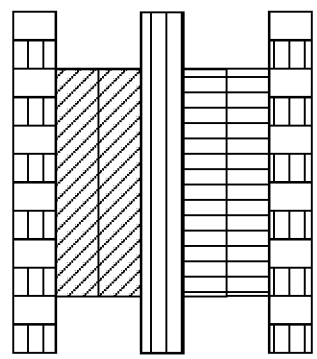
FIG. 11B is a schematic diagram of an exemplary illustration of a synchronization signal block (SSB) according to an implementation of the present disclosure.
Figure 11C:
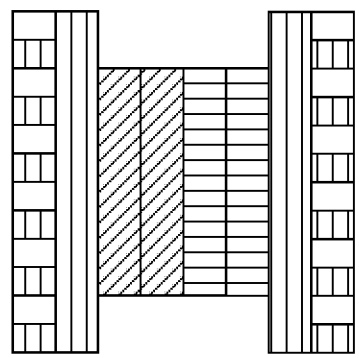
FIG. 11C is a schematic diagram of an exemplary illustration of a synchronization signal block (SSB) according to an implementation of the present disclosure.
Figure 11D:
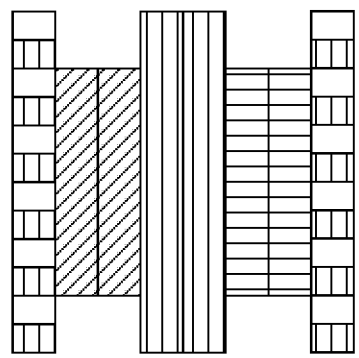
FIG. 11D is a schematic diagram of an exemplary illustration of a synchronization signal block (SSB) according to an implementation of the present disclosure.
Figure 12:
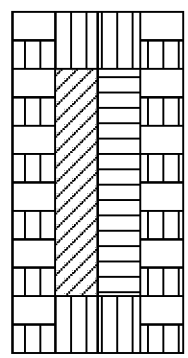
FIG. 12 is a schematic diagram of an exemplary illustration of a synchronization signal block (SSB) according to an implementation of the present disclosure.

Within an SSB, there are two adjacent OFDM symbols used for S-PSS, two adjacent OFDM symbols used for S-SSS. FIG. 11A illustrates that, in some implementations, within an SSB, there are two OFDM symbols used for PSBCH. S-PSS occupies the 2nd, 3rd OFDM symbols, S-SSS occupies the 4th and 5th OFDM symbols. PSBCH occupies the 1st and 6th OFDM symbols. FIG. 11B illustrates that, in some implementations, within an SSB, there are three OFDM symbols used for PSBCH. Within an SSB, the 1st, 4th, and 7th OFDM symbols are used for PSBCH, 2nd and 3rd OFDM symbols are used for S-PSS, and 5th and 6th OFDM symbols are used for S-SSS. FIG. 11C illustrates that, in some implementations, within an SSB, there are four OFDM symbols used for PSBCH. Within an SSB, the 1st, 2nd, 7th, and 8th OFDM symbols are used for PSBCH, 3rd and 4th OFDM symbols are used for S-PSS, and 5th and 6th OFDM symbols are used for S-SSS. FIG. 11D illustrates that, in some implementations, within an SSB, there are four OFDM symbols used for PSBCH. Within an SSB, the 1st, 4th, 5th, and 8th OFDM symbols are used for PSBCH, 2nd and 3rd OFDM symbols are used for S-PSS, and 6th and 7th OFDM symbols are used for S-SSS. FIGS. 11A, 11B, 11C, and 11D illustrate that, in some implementations, the resources used for PSBCH transmission include the resources used for both PSBCH payload and DMRS. The candidate ways to multiplex DMRS and PSBCH payload, which is illustrated in FIG. 5 and/or FIG. 10, are also applicable for FIGS. 11A, 11B, 11C, and 11D. FIGS. 11A, 11B, 11C, and 11D illustrate that, in some implementations, if the frequency resource of PSBCH is larger than S-PSS and S-SSS, part of the frequency resource on the OFDM symbols used for S-PSS and/or S-SSS can also be used for PSBCH to align the frequency resource between PSBCH and S-SSS, or between PSBCH and S-PSS. One illustration of mapping PSBCH on S-PSS/S-SSS OFDM symbols of FIG. 11A is illustrated in FIG. 12.

Figure 13A:
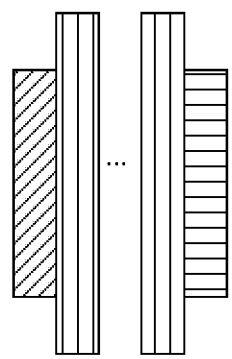
FIG. 13A is a schematic diagram of an exemplary illustration of a synchronization signal block (SSB) according to an implementation of the present disclosure.
Figure 13B:
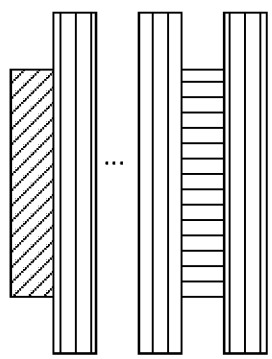
FIG. 13B is a schematic diagram of an exemplary illustration of a synchronization signal block (SSB) according to an implementation of the present disclosure.
Figure 13C:
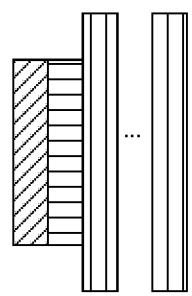
FIG. 13C is a schematic diagram of an exemplary illustration of a synchronization signal block (SSB) according to an implementation of the present disclosure.
Figure 14:
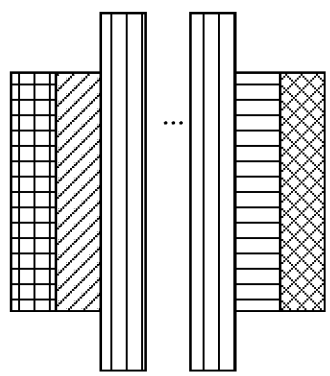
FIG. 14 is a schematic diagram of an exemplary illustration of a synchronization signal block (SSB) according to an implementation of the present disclosure.

FIGS. 13A, 13B, and 13C illustrate that, in some implementations, within an SSB, there is one S-PSS OFDM symbol, one S-SSS OFDM symbol. FIG. 13A illustrates that, in some implementations, a S-PSS OFDM symbol is at the beginning of the SSB, S-SSS OFDM symbol is at the end of the SSB, PSBCH is in between S-PSS and S-SSS, there are more than 1 OFDM symbol for PSBCH. FIG. 13B illustrates that, in some implementations, S-PSS OFDM symbol is at the beginning of the SSB, there are more than 1 OFDM symbol for PSBCH, the last OFDM symbol is used for PSBCH, the second last OFDM symbol is used for S-SSS, the rest OFDM symbols of PSBCH are between S-PSS and S-SSS. FIG. 13C illustrates that, in some implementations, the 1st OFDM symbol is used for S-PSS, the 2nd OFDM symbol is used for S-SSS, there are more than 1 OFDM symbol for PSBCH, PSBCH OFDM symbols are after S-SSS OFDM symbol. FIGS. 13A, 13B, and 13C illustrate that, in some implementations, there can be one additional OFDM in front of the first OFDM of the SSB that is used as AGC, and/or one additional OFDM symbol after the last OFDM symbol of the SSB that is used as GP. One illustration of FIG. 13A with additional AGC and GP symbols is illustrated in FIG. 14.

In some implementations, the AGC symbol can be mapped with PSBCH payload or padding bits. If AGC symbol is mapped with PSBCH payload, it can be comb-like mapped, which is similar as the first OFDM symbol in FIG. 9A. The GP symbol can be left empty. Or the GP symbol can be comb-like mapped by PSBCH payload, which is similar as the last OFDM symbol in FIG. 9A, the rest resource elements that are not mapped by PSBCH are left empty. If the frequency resource of PSBCH is larger than S-PSS and S-SSS, part of the frequency resource on the OFDM symbols used for S-PSS and/or S-SSS can also be used for PSBCH. The frequency resource of PSBCH and S-SSS can be aligned, or the frequency resource of PSBCH and S-PSS can be aligned.

In summary, for all the above implementations, there can be the following characteristics:

1. The frequency resources of S-PSS and S-SSS are the same. For example, the frequency resource sizes of S-PSS and S-SSS are same. The starting positions in a frequency domain of S-PSS and S-PSS are same.

2. For all the implementations, the S-PSS OFDM symbol(s) are in front of S-SSS OFDM symbol(s). It is also possible that the S-SSS OFDM symbol(s) are in front of S-PSS OFDM symbol(s).

3. For comb-like resource mapping of S-PSS sequence, S-SSS sequence and PSBCH payload, the parameters configured to determine a comb-like resource mapping are pre-configured or configured by a network.

4. The SSB can be located at the frequency center of a carrier. Or the frequency location of SSB is pre-configured or configured by a network.

5. The position of an SSB in the time domain (for example the slot and symbol position of SSB) is pre-configured or configured by a network.

6. The periodicity of SSB is pre-configured or configured by a network.

In summary, the above implementations have technical features as following. Comb-like resource mapping of S-PSS is onto the first/last OFDM symbol of an SSB. Comb-like resource mapping of S-SSS is onto the first/last OFDM symbol of an SSB. Comb-like resource mapping of PSBCH is onto the first/last OFDM symbol of an SSB. If S-PSS is comb-like mapped to one OFDM symbol, the rest OFDM symbols used for S-PSS are also comb-like mapped. If S-SSS is comb-like mapped to one OFDM symbol, the rest OFDM symbols used for S-SSS are also comb-like mapped.

Figure 15:
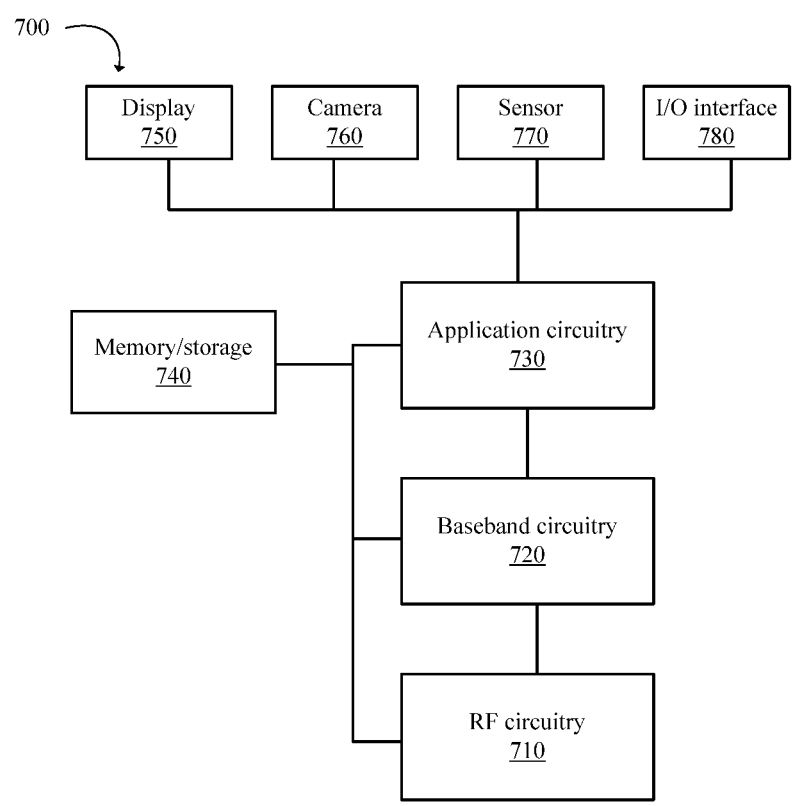
FIG. 15 is a block diagram of a system for wireless communication according to an implementation of the present disclosure.

FIG. 15 is a block diagram of an example system 700 for wireless communication according to an implementation of the present disclosure. Implementations described herein may be implemented into the system using any suitably configured hardware and/or software. FIG. 15 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some implementations, the baseband circuitry may provide for communication compatible with one or more radio technologies. For example, in some implementations, the baseband circuitry may support communication with an evolved universal terrestrial radio access network (EUTRAN) and/or other wireless metropolitan area networks (WMAN), a wireless local area network (WLAN), a wireless personal area network (WPAN). Implementations in which the baseband circuitry is configured to support radio communications of more than one wireless protocol may be referred to as multi-mode baseband circuitry.

In various implementations, the baseband circuitry 720 may include circuitry to operate with signals that are not strictly considered as being in a baseband frequency. For example, in some implementations, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various implementations, the RF circuitry may include switches, filters, amplifiers, etc. to facilitate the communication with the wireless network. In various implementations, the RF circuitry 710 may include circuitry to operate with signals that are not strictly considered as being in a radio frequency. For example, in some implementations, RF circuitry may include circuitry to operate with signals having an intermediate frequency, which is between a baseband frequency and a radio frequency.

In various implementations, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an application specific integrated circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some implementations, the electronic device circuitry may be implemented in, or functions associated with the circuitry may be implemented by, one or more software or firmware modules.

In some implementations, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one implementation may include any combination of suitable volatile memory, such as dynamic random access memory (DRAM)), and/or non-volatile memory, such as flash memory. In various implementations, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various implementations, the sensor 770 may include one or more sensing devices to determine environmental conditions and/or location information related to the system. In some implementations, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various implementations, the display 750 may include a display, such as a liquid crystal display and a touch screen display. In various implementations, the system 700 may be a mobile computing device such as, but not limited to, a laptop computing device, a tablet computing device, a netbook, an ultrabook, a smartphone, etc. In various implementations, system may have more or less components, and/or different architectures. Where appropriate, methods described herein may be implemented as a computer program. The computer program may be stored on a storage medium, such as a non-transitory storage medium.

Some implementations of the present disclosure provide user equipment and a method for transmitting a synchronization signal block (SSB) of the same capable of performing vehicle-to-everything (V2X) communication and improving reliability. The implementation of the present disclosure is a combination of techniques/processes that can be adopted in 3GPP specification to create an end product.

A person having ordinary skill in the art understands that each of the units, algorithm, and steps described and disclosed in the implementations of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned implementation since the working processes of the above-mentioned system, device, and unit are basically the same. For easy description and simplicity, these working processes will not be detailed.

It is understood that the disclosed system, device, and method in the implementations of the present disclosure can be realized with other ways. The above-mentioned implementations are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms. The units as separating components for explanation are or are not physically separated. The units for display are or are not physical units, that is, located in one place or distributed on a plurality of network units. Some or all of the units are used according to the purposes of the implementations. Moreover, each of the functional units in each of the implementations can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the implementations of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred implementations, it is understood that the present disclosure is not limited to the disclosed implementations but is intended to cover various arrangements made without departing from the scope of the broadest interpretation of the appended claims.

What is claimed is:

1. A user equipment for transmitting a synchronization signal block (SSB), comprising:
   a memory;
   a transceiver; and
   a processor coupled to the memory and the transceiver;
   wherein the processor is configured to control the transceiver to transmit an SSB by using a resource set within a subframe or slot, wherein the SSB comprises a sidelink primary synchronization signal (S-PSS), a sidelink secondary synchronization signal (S-SSS), and a physical sidelink broadcast channel (PSBCH), and the resource set comprises two adjacent orthogonal frequency division multiplexing (OFDM) symbols used for the S-PSS, two adjacent OFDM symbols used for the S-SSS, and positions of the OFDM symbols used for the S-PSS are in front of positions of the OFDM symbols used for the S-SSS,
   wherein the second symbol used for the S-PSS is adjacent in time domain to the first symbol used for the S-SSS,
   a symbol in front of the S-PSS is used for the PSBCH, and a symbol after the S-SSS is used for the PSBCH, and
   a first OFDM symbol and a last OFDM symbol within the SSB are used for the PSBCH.

2. The user equipment of claim 1, wherein, the symbol in front of the S-PSS used for the PSBCH is the first symbol within the SSB.

3. The user equipment of claim 1, wherein an OFDM symbol used for the PSBCH comprises a resources used for a demodulation reference signal (DMRS) which is configured to decode the PSBCH.

4. The user equipment of claim 1, wherein the two OFDM symbols used for the S-PSS are the second and third OFDM symbols within the SSB, and the two OFDM symbols used for the S-SSS are the fourth and fifth OFDM symbols within the SSB.

5. The user equipment of claim 1, wherein the SSB is located at a frequency center of a carrier or a frequency location of the SSB is pre-configured or configured by a network.

6. The user equipment of claim 1, wherein a position of the SSB in a time domain is pre-configured or configured by a network.

7. The user equipment of claim 1, wherein a periodicity of the SSB is pre-configured or configured by a network.

8. The user equipment of claim 1, wherein frequency resources of the S-PSS and the S-SSS are same.

9. The user equipment of claim 1, wherein frequency resources used for the PSBCH are larger than frequency resources used for the S-PSS or the S-SSS.

10. A method for transmitting a synchronization signal block (SSB) of a user equipment, comprising:
    transmitting an SSB by using a resource set within a subframe or slot, wherein the SSB comprises a sidelink primary synchronization signal (S-PSS), a sidelink secondary synchronization signal (S-SSS), and a physical sidelink broadcast channel (PSBCH), and the resource set comprises two adjacent orthogonal frequency division multiplexing (OFDM) symbols used for the S-PSS, two adjacent OFDM symbols used for the S-SSS, and positions of the OFDM symbols used for the S-PSS are in front of positions of the OFDM symbols used for the S-SSS,
    wherein the second symbol used for the S-PSS is adjacent in time domain to the first symbol used for the S-SSS,
    a symbol in front of the S-PSS is used for the PSBCH, and a symbol after the S-SSS is used for the PSBCH, and
    a first OFDM symbol and a last OFDM symbol within the SSB are used for the PSBCH.

11. The method of claim 10, wherein the symbol in front of the S-PSS used for the PSBCH is the first symbol within the SSB.

12. The method of claim 10, wherein an OFDM symbol used for the PSBCH comprises a resources used for a demodulation reference signal (DMRS) which is configured to decode the PSBCH.

13. The method of claim 10, wherein the two OFDM symbols used for the S-PSS are the second and third OFDM symbols within the SSB, and the two OFDM symbols used for the S-SSS are the fourth and fifth OFDM symbols within the SSB.

14. The method of claim 10, wherein the SSB is located at a frequency center of a carrier or a frequency location of the SSB is pre-configured or configured by a network.

15. The method of claim 10, wherein a position of the SSB in a time domain is pre-configured or configured by a network.

16. The method of claim 10, wherein a periodicity of the SSB is pre- configured or configured by a network.

17. The method of claim 10, wherein frequency resources of the S-PSS and the S-SSS are same.

18. The method of claim 10, wherein frequency resources used for the PSBCH are larger than frequency resources used for the S-PSS or the S-SSS.

* * * * *